US009447509B2

(12) United States Patent
Suzuki et al.

(10) Patent No.: US 9,447,509 B2
(45) Date of Patent: Sep. 20, 2016

(54) HYDROGEN PRODUCING CELL, HYDROGEN PRODUCING DEVICE, AND ENERGY SYSTEM INCLUDING THE HYDROGEN PRODUCING DEVICE

(71) Applicant: PANASONIC CORPORATION, Kadoma-shi, Osaka (JP)

(72) Inventors: Takahiro Suzuki, Osaka (JP); Takaiki Nomura, Osaka (JP); Kazuhito Hato, Osaka (JP); Kenichi Tokuhiro, Osaka (JP); Satoru Tamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 398 days.

(21) Appl. No.: 14/115,029

(22) PCT Filed: Apr. 3, 2013

(86) PCT No.: PCT/JP2013/002313
§ 371 (c)(1),
(2) Date: Oct. 31, 2013

(87) PCT Pub. No.: WO2013/153779
PCT Pub. Date: Oct. 17, 2013

(65) Prior Publication Data
US 2014/0072891 A1    Mar. 13, 2014

(30) Foreign Application Priority Data

Apr. 11, 2012   (JP) .................. 2012-089786

(51) Int. Cl.
*C25B 1/10* (2006.01)
*C25B 1/02* (2006.01)
(Continued)

(52) U.S. Cl.
CPC ................ *C25B 1/10* (2013.01); *C01B 3/042* (2013.01); *C25B 1/003* (2013.01); *C25B 1/02* (2013.01);
(Continued)

(58) Field of Classification Search
CPC ........ H01M 8/0656; C25B 1/02; C25B 1/06; C25B 1/10
USPC ......................................... 429/422
See application file for complete search history.

(56) References Cited

U.S. PATENT DOCUMENTS 5,589,052 A * 12/1996 Shimamune .............. C25B 1/10
205/349
2011/0315545 A1   12/2011 Kuroha et al.
(Continued)

FOREIGN PATENT DOCUMENTS

CN           102334230         1/2012
CN           102369312         3/2012
(Continued)

OTHER PUBLICATIONS

English Translation of Chinese Search Report dated Nov. 6, 2015 for the related Chinese Patent Application No. 201380001465.2.

*Primary Examiner* — Basia Ridley
*Assistant Examiner* — James Erwin
(74) *Attorney, Agent, or Firm* — Hamre, Schumann, Mueller & Larson, P.C.

(57) ABSTRACT

A hydrogen producing cell of the present invention is provided with an electrolyte supply hole, an electrolyte discharge hole, a first hydrogen circulation hole and a second hydrogen circulation hole respectively penetrating a housing. In disposing the hydrogen producing cell, the electrolyte supply hole is arranged on a vertically upper side than the electrolyte discharge hole, the first hydrogen circulation hole is arranged on a vertically upper side than the electrolyte supply hole, and the second hydrogen circulation hole is arranged on a vertically upper side than the electrolyte discharge hole. By this configuration, it is possible to considerably reduce the length of a pipe and the number of manifolds concerning the electrolyte and hydrogen, and to link the hydrogen producing cells with one another simply and rationally.

19 Claims, 9 Drawing Sheets

(51) Int. Cl.
*C25B 1/06* (2006.01)
*C25B 1/04* (2006.01)
*C25B 9/00* (2006.01)
*C01B 3/04* (2006.01)
*C25B 9/10* (2006.01)
*C25B 9/18* (2006.01)
*C25B 15/08* (2006.01)
*H01M 8/06* (2016.01)
*C25B 1/00* (2006.01)

(52) U.S. Cl.
CPC . *C25B 1/04* (2013.01); *C25B 1/06* (2013.01); *C25B 9/00* (2013.01); *C25B 9/10* (2013.01); *C25B 9/18* (2013.01); *C25B 15/08* (2013.01); *H01M 8/0656* (2013.01); *Y02E 60/364* (2013.01); *Y02E 60/366* (2013.01); *Y02E 60/368* (2013.01); *Y02E 60/50* (2013.01)

(56) References Cited

U.S. PATENT DOCUMENTS

2012/0028141 A1 2/2012 Nomura et al.
2012/0080310 A1 4/2012 Nomura et al.
2013/0015076 A1 1/2013 Yoshida et al.

FOREIGN PATENT DOCUMENTS

| JP | 2008-507464 | 3/2008 |
| JP | 2008-075097 | 4/2008 |
| WO | 2005/113859 | 12/2005 |
| WO | 2010/140353 | 12/2010 |
| WO | 2011/096142 | 8/2011 |

* cited by examiner

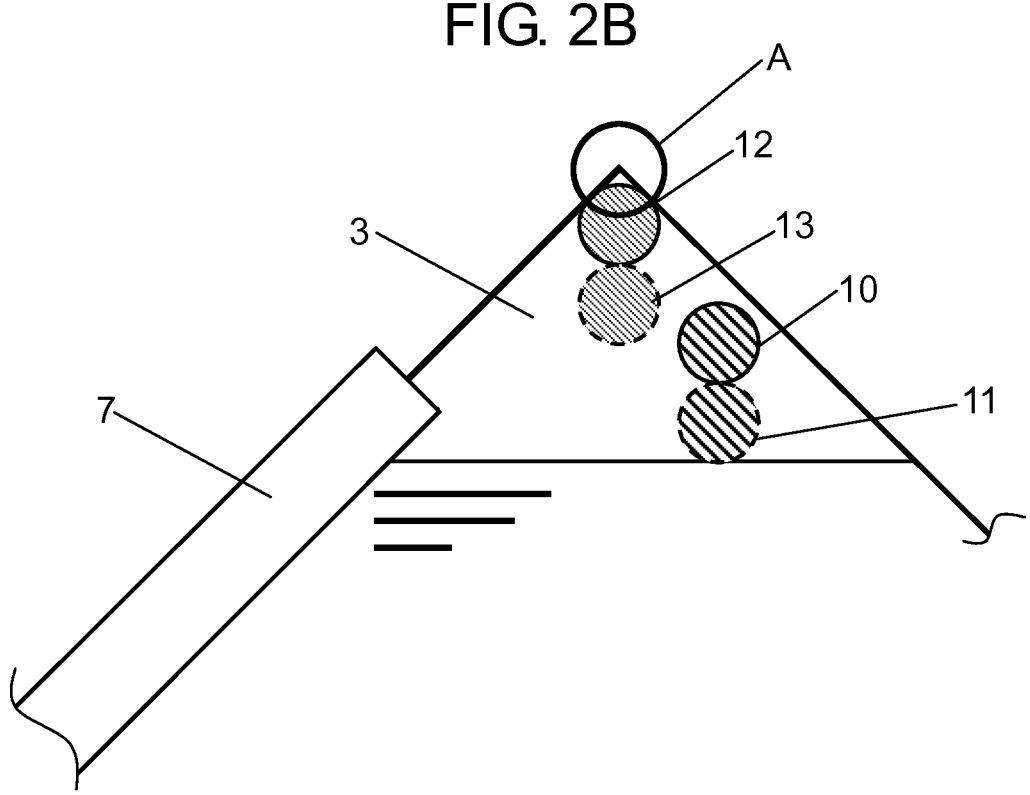

HYDROGEN PRODUCING CELL, HYDROGEN PRODUCING DEVICE, AND ENERGY SYSTEM INCLUDING THE HYDROGEN PRODUCING DEVICE

This application is a U.S. national phase application of PCT international application PCT/JP2013/002313.

TECHNICAL FIELD

The present invention relates to a hydrogen producing cell and a hydrogen producing device, which decompose water into hydrogen and oxygen to obtain hydrogen by use of light, and an energy system including the hydrogen producing device.

BACKGROUND ART

Conventionally, as a method for utilization of a semiconductor material functioning as a photocatalyst, it is known to decompose water to produce hydrogen or to generate electrical energy by irradiating a semiconductor material with light (for example, PTL 1).

PTL 1 discloses a photo-assisted water electrolysis apparatus having a function of converting light energy obtained from solar light to hydrogen energy. The photo-assisted water electrolysis apparatus is composed of a plurality of laminated photo-assisted water electrolysis cells. Each photo-assisted water electrolysis cell has a box-like casing whose peripheral portion is surrounded with an outer wall made of a transparent glass or synthetic resin plate, and is arranged in a state of being inclined at a given angle from the horizontal state. An electrolyte is accommodated in a lower portion of the photo-assisted water electrolysis cell, and a separation wall which divides the photo-assisted water electrolysis cell into two spaces is provided in the middle of the thickness direction of the cell. The separation wall is formed by integrally joining a gas separation membrane arranged on an upper side with a photo-assisted water electrolysis electrode/membrane assembly arranged on a lower side, and plays a role of separating the produced hydrogen from the produced oxygen. In the photo-assisted water electrolysis electrode/membrane assembly, a photocatalyst electrode and a platinum counter electrode are respectively formed on both surfaces of a Nafion membrane which is an ionic conductive membrane arranged in the middle of the thickness direction. In the photo-assisted water electrolysis electrode/membrane assembly, irradiation of solar light causes the photo-assisted water electrolysis, and oxygen is produced from the photocatalyst electrode and hydrogen is produced from the platinum counter electrode. Further, the lower end of the separation wall is provided with a rectangular through hole, and the electrolyte can be circulated within the photo-assisted water electrolysis cell through the through hole. Further, in an outer wall of the photo-assisted water electrolysis cell, a rectangular circulation hole in planar view is formed, and a movable wall which makes the opening area of the circulation hole freely variable is provided.

Then, the electrolyte is supplied to each photo-assisted water electrolysis cell by admission through a circulation hole of the electrolyte having overflown from a neighboring photo-assisted water electrolysis cell located on an upstream side. Similarly, the electrolyte is discharged from each photo-assisted water electrolysis cell by effusion of the electrolyte to a neighboring photo-assisted water electrolysis cell located on a downstream side. By employing such a mechanism, a pipe length required for supply/discharge of an electrolyte and the man-hours needed to install piping are reduced.

However, in the case of the above-mentioned photo-assisted water electrolysis apparatus, no contrivance is shown concerning the piping required for collecting the produced hydrogen.

For example, with respect to the photo-assisted water electrolysis apparatus in which a plurality of photo-assisted water electrolysis cells are laminated, a method of attaching separate hydrogen collecting pipes to every photo-assisted water electrolysis cell will be considered. In this method, it is necessary to attach at least the same number of hydrogen collecting pipes as the total number of the photo-assisted water electrolysis cells to be arranged, and further the hydrogen collecting pipes form a plurality of manifolds. In such a configuration, not only the configuration is complicated and the length of hydrogen collecting pipes is significantly long, but also control of circulation of hydrogen is difficult since there are many manifolds, and man-hours required for disposing pipes increase. This is a large problem in considering commercialization of the photo-assisted water electrolysis apparatus.

Then, in view of these conventional problems, it is an object of the present invention to provide a hydrogen producing device which produces hydrogen by utilizing a decomposition reaction of water by an optical semiconductor, and an energy system including the hydrogen producing device. Specifically, the length of a hydrogen collecting pipe connected to each hydrogen producing cell constituting the hydrogen producing device and the number of manifolds are considerably reduced. Further, in order to commercialize the hydrogen producing device, it is essential to produce a sufficient amount of hydrogen by linking a large number of hydrogen producing cells. Accordingly, it is also an object of the present invention to provide a simple and rational member and method for linking the hydrogen producing cells together.

CITATION LIST

Patent Literature

PTL 1: Unexamined Japanese Patent Publication No. 2008-75097

SUMMARY OF THE INVENTION

A hydrogen producing cell of the present invention includes a housing whose surface irradiated with light has a light-transmitting property; a separator separating a space within the housing into a first space and a second space; a counter electrode arranged in the first space; an optical semiconductor electrode arranged in the second space and formed on a conductive substrate; an electrical connection part electrically connecting the optical semiconductor electrode with the counter electrode; and an electrolyte containing water in the first space and in the second space. Further, the hydrogen producing cell is also provided with an electrolyte supply hole and an electrolyte discharge hole respectively penetrating the housing, and a first hydrogen circulation hole and a second hydrogen circulation hole respectively penetrating the housing in contact with, of the first space and the second space, a space in which hydrogen is produced. At this time, the electrolyte supply hole is arranged on a vertically upper side than the electrolyte discharge hole, the first hydrogen circulation hole is arranged on a vertically upper side than the electrolyte supply hole, and the second hydrogen circulation hole is arranged on a vertically upper side than the electrolyte discharge hole.

Moreover, the electrolyte supply hole of one of neighboring hydrogen producing cells and the electrolyte discharge hole of the other of neighboring hydrogen producing cells, and the first hydrogen circulation hole of one of neighboring hydrogen producing cells and the second hydrogen circulation hole of the other of neighboring hydrogen producing cells are respectively connected to each other to configure a hydrogen producing device.

By employing such a configuration, the pipe length of pipes for supply/discharge of an electrolyte and pipes for collecting produced hydrogen and the number of manifolds are considerably reduced, and by irradiating an optical semiconductor electrode with light, water is decomposed to produce hydrogen.

With the hydrogen producing cell, the hydrogen producing device, and the energy system including the hydrogen producing device according to the present invention, the length of a hydrogen collecting pipe connected to each hydrogen producing cell constituting the hydrogen producing device and the number of manifolds can be considerably reduced. Further, it is possible to provide a simple and rational member and method for linking the hydrogen producing cells together, which facilitate the linkage between a large number of hydrogen producing cells for producing a sufficient amount of hydrogen.

BRIEF DESCRIPTION OF DRAWINGS

FIG. 2B is a schematic view showing another configuration of the hydrogen producing cell of second exemplary embodiment of the present invention.

DESCRIPTION OF EMBODIMENTS

Figure 1A:
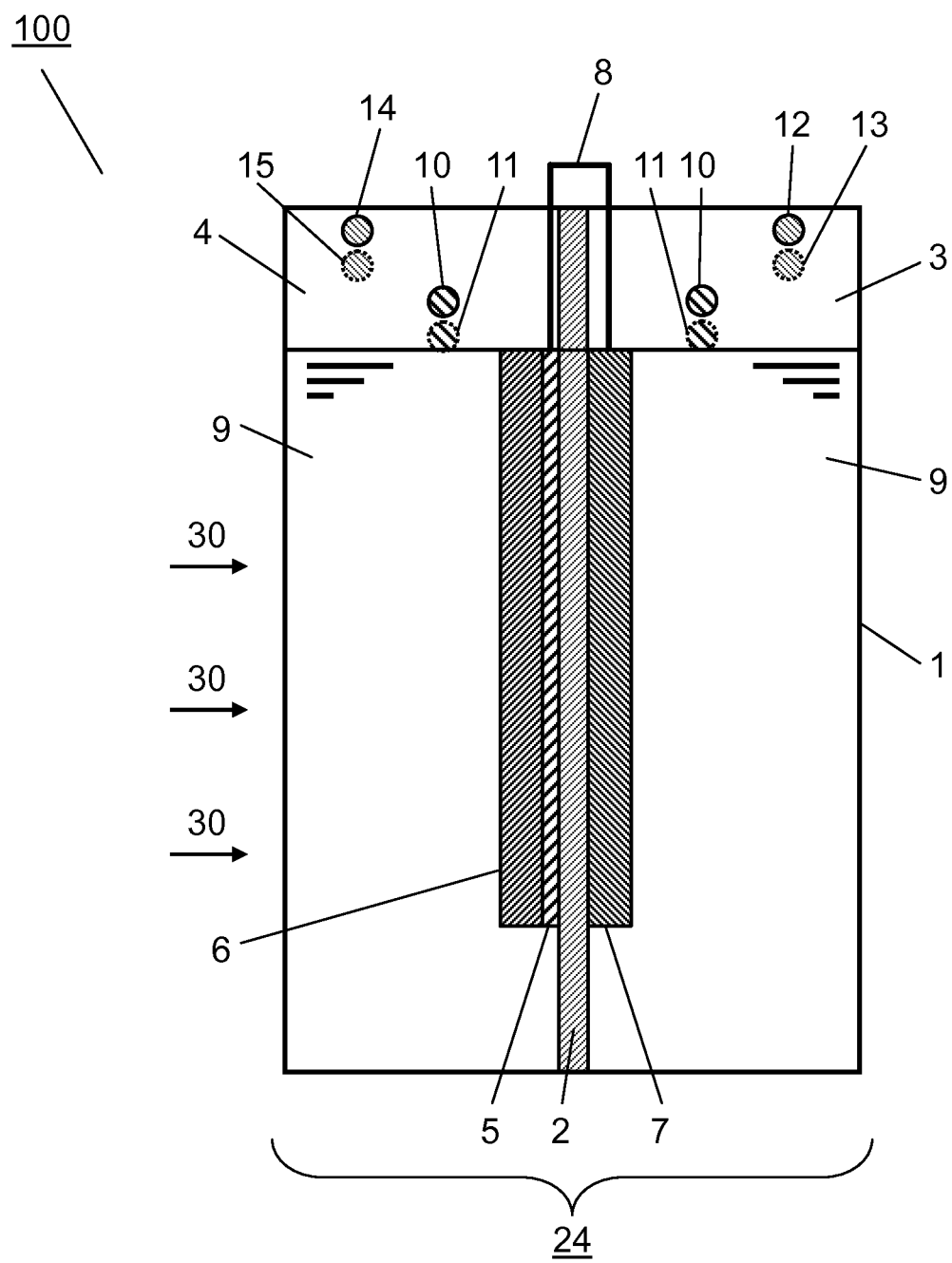
FIG. 1A is a schematic view showing a configuration of a hydrogen producing cell of first exemplary embodiment of the present invention.

A hydrogen producing cell of the present invention has the following functions concerning the circulation of the electrolyte and produced hydrogen by arranging an electrolyte supply hole, an electrolyte discharge hole, a first hydrogen circulation hole and a second hydrogen circulation hole, respectively provided in a housing, in the positional relations described above.

Herein, mutual positional relations (vertically upper side, vertically lower side, etc.) among the electrolyte supply hole, the electrolyte discharge hole, the first hydrogen circulation hole and the second hydrogen circulation hole in the hydrogen producing cell of the present invention is required to be satisfied in a state where the hydrogen producing cell is ultimately disposed as a hydrogen producing device or an energy system.

In addition, hereinafter, descriptions will be made for the case where an optical semiconductor electrode described later is an n-type semiconductor and a place where oxygen is produced, and a counter electrode is a place where hydrogen is produced. However, the case where the optical semiconductor electrode is a p-type semiconductor will be described by interchanging hydrogen with oxygen in the above-mentioned descriptions for the case of an n-type semiconductor.

First, the circulation of the electrolyte will be described. The electrolyte is supplied from the electrolyte supply hole to the first space and the second space within the housing, and is discharged from the electrolyte discharge hole. Since the supply hole is arranged on a vertically upper side than the discharge hole, of the electrolyte supplied from the supply hole, the electrolyte which is present at a vertically upper position than the height of the lower end of the discharge hole is spontaneously discharged from the electrolyte discharge hole with gravity. Thus, the height of the electrolyte level is determined by the height of the lower end of the electrolyte discharge hole. Further, since the first and second hydrogen circulation holes are arranged on a vertically upper side than the electrolyte discharge hole, the electrolyte level does not elevate to the height of the lower end of the circulation hole, and therefore it is possible to prevent a situation that the electrolyte enters the circulation hole in which only hydrogen should be essentially circulated. That is, the electrolyte is unidirectionally and spontaneously circulated from the supply hole only to the discharge hole with gravity. Moreover, when the electrolyte supply hole of one of neighboring hydrogen producing cells and the electrolyte discharge hole of the other of neighboring hydrogen producing cells are connected to each other, the electrolyte overflown from an upstream cell is unidirectionally and spontaneously circulated to a downstream cell through a connecting part with gravity. Thinking the above descriptions in terms of the whole hydrogen producing device configured by connecting a plurality of hydrogen producing cells to one another, by merely supplying an electrolyte from only one electrolyte supply hole of the hydrogen producing cell arranged at the most upstream position, the electrolyte is supplied to all the hydrogen producing cells in order from the upstream and is discharged from only one electrolyte discharge hole of the hydrogen producing cell arranged at the most downstream position. In addition, the electrolyte level is stably maintained at a predetermined height in each hydrogen producing cell. Since all the hydrogen producing cells are thus connected in series in terms of an electrolyte, only an electrolyte supply pipe connected to the most upstream hydrogen producing cell and an electrolyte discharge pipe connected to the most downstream hydrogen producing cell are required for supply/discharge of an electrolyte, and therefore the pipe length and the number of manifolds can be considerably reduced.

Next, the circulation of produced hydrogen will be described. Hydrogen produced on a counter electrode of each hydrogen producing cell rises in the electrolyte and gathers above the electrolyte level in an upper portion of the first space. As described above, since the lower end of the first and second hydrogen circulation holes are arranged on a vertically upper side than the electrolyte discharge hole defining the height of the electrolyte level, the electrolyte does not enter the first and second hydrogen circulation holes, and these circulation holes are always brought into contact with only hydrogen. Thereby, hydrogen having gathered in the upper portion of the first space can move to the outside of the hydrogen producing cell through the first and second hydrogen circulation holes. Moreover, when the first hydrogen circulation hole of one of neighboring hydrogen producing cells and the second hydrogen circulation hole of the other of neighboring hydrogen producing cells are connected to each other, hydrogen is circulated to a neighboring cell through a connecting part. Thinking the above descriptions in terms of the whole hydrogen producing device configured by connecting a plurality of hydrogen producing cells to one another, spaces in which hydrogen in the respective hydrogen producing cells gathers are all combined, and these space portions play a role as a pipe combining all the hydrogen producing cells. By employing this configuration, hydrogen produced in all the hydrogen producing cells can be collected only by separately connecting a hydrogen collecting pipe to an uppermost portion of the first space of any hydrogen producing cell. That is, only a hydrogen collecting pipe is required as hydrogen circulation/collecting pipes, and the pipe length and the number of manifolds can be considerably reduced.

Moreover, also from another viewpoint, the effect of employing the configuration of connecting the hydrogen producing cells of the present invention to one another is found. As a comparison to the present invention, a configuration is considered, in which a plurality of hydrogen producing cells are connected to one another in a vertical direction. In this case, hydrogen produced in a hydrogen producing cell rises to the upper portion of the cell and flows into the lowermost portion of an upper neighboring hydrogen producing cell through a connecting part. Hydrogen having flown in rises in the electrolyte in the upper neighboring hydrogen producing cell and flows into a further upper hydrogen producing cell. When this configuration is employed, in the electrolyte in one hydrogen producing cell, bubbles of hydrogen produced in all the hydrogen producing cells arranged below the above-mentioned hydrogen producing cell are immixed. This situation is more remarkable in a hydrogen producing cell located on a more upper side. Since a large amount of bubbles immixed in the electrolyte causes polarization of an electrode or scattering of light incident on an optical semiconductor electrode surface, production efficiency of hydrogen in the hydrogen producing cell is lowered.

On the other hand, in a plurality of hydrogen producing cells of the present invention, the plurality of hydrogen producing cells are connected to one another in a lateral direction. In this case, hydrogen produced in a hydrogen producing cell rises to the upper portion of the cell and flows into a space above the electrolyte level of a laterally neighboring hydrogen producing cell through a connecting part. When this configuration is employed, bubbles of hydrogen produced in other hydrogen producing cells are prevented from being immixed in the electrolyte in one hydrogen producing cell. Thus, polarization or scattering of light resulting from bubbles immixed described above does not occur, and high production efficiency of hydrogen can be maintained in all the hydrogen producing cells constituting a hydrogen producing device.

From the above-mentioned viewpoint, it can be said that the configuration of the present invention in which the plurality of hydrogen producing cells are connected to one another in a lateral direction is suitable for a hydrogen producing device.

Hereinafter, embodiments of the present invention will be described in detail with reference to drawings. The following embodiments are just examples, and the present invention is not limited to the following embodiments. In the following exemplary embodiments, the same members are indicated with identical reference marks and the redundant descriptions thereof may be omitted.

(First Exemplary Embodiment)

Figure 1B:
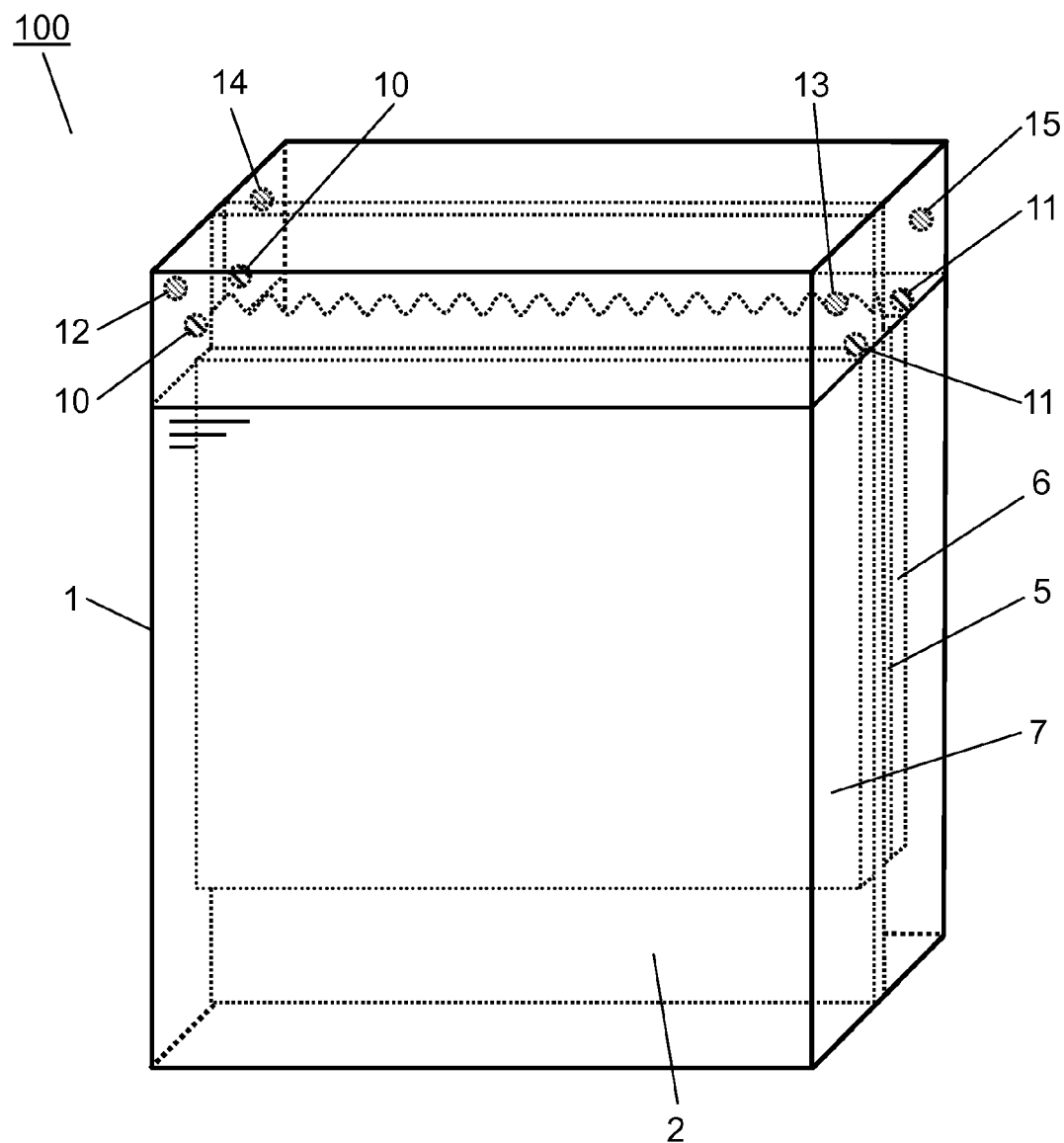
FIG. 1B is a schematic view of the configuration of the hydrogen producing cell of first exemplary embodiment of the present invention viewed from a first space.

A hydrogen producing cell of first exemplary embodiment of the present invention will be described with reference to FIG. 1A and FIG. 1B. FIG. 1A is a schematic view showing a configuration of a hydrogen producing cell of the present exemplary embodiment, and FIG. 1B is a schematic view of the configuration of the hydrogen producing cell of the present exemplary embodiment viewed from a first space.

Hydrogen producing cell 100 of the present exemplary embodiment has housing 1 whose surface irradiated with light (irradiation light 30), at least, has a light-transmitting property. Separator 2 is disposed in a direction substantially parallel to the surface of housing 1 irradiated with light so as to divide a space within housing 1 into two. First space 3 and second space 4 separated by separator 2, and conductive substrate 5 directed in a direction substantially parallel to the surface of housing 1 irradiated with light in the second space are disposed. Optical semiconductor electrode 6 is formed on conductive substrate 5. Counter electrode 7 is disposed in the first space. Electrical connection part 8 electrically connects conductive substrate 5 with counter electrode 7. Electrolyte 9 containing water is present in both of the first space and the second space.

Describing the present invention along a traveling direction of light incident on hydrogen producing cell 100, in hydrogen producing cell 100, one surface of housing 1 having a light-transmitting property, electrolyte 9, optical semiconductor electrode 6, conductive substrate 5, separator 2, counter electrode 7, electrolyte 9, and the other surface of housing 1 are arranged in this order from a side irradiated with light. Optical semiconductor electrode 6 may be in contact with separator 2 or apart from separator 2. Counter electrode 7 may be in contact with separator 2 or apart from separator 2. Separator 2 plays a role of exchanging ions between electrolyte 9 in the first space and electrolyte 9 in the second space. Therefore, at least a part of separator 2 is in contact with electrolyte 9 in the first space and the second space.

Electrolyte supply hole 10 and electrolyte discharge hole 11 are disposed in both the first space and the second space so as to penetrate housing 1. First hydrogen circulation hole 12 and second hydrogen circulation hole 13 are disposed in the first space so as to penetrate housing 1. Moreover, the electrolyte supply hole/electrolyte discharge hole and the hydrogen circulation hole are arranged so as to set the following positional relation in arranging hydrogen producing cell 100. Electrolyte supply hole 10 is arranged on a vertically upper side than electrolyte discharge hole 11. First hydrogen circulation hole 12 is arranged on a vertically upper side than electrolyte supply hole 10. Second hydrogen circulation hole 13 is arranged on a vertically upper side than electrolyte discharge hole 11. Further, an oxygen discharge hole may be disposed on the second space side. Moreover, when oxygen is collected, first oxygen circulation hole 14 and second oxygen circulation hole 15 can be disposed in place of the oxygen discharge hole so as to penetrate housing 1 on the second space side in the same positional relation as in the hydrogen circulation port.

Next, each constituent component of hydrogen producing cell 100 will be specifically described for the case where the oxygen circulation hole is provided.

For a surface of housing 1 irradiated with light, a material having corrosion resistance to electrolyte 9 and an insulating property and transmitting light in a visible light region, more preferably light including wavelengths around a visible light region is used. Examples of the material include glass and resins. Materials of other surfaces of housing 1 have only to have corrosion resistance to electrolyte 9 and an insulating property, and do not need to have a property of transmitting light. As the material, metals subjected to surface treatment for corrosion resistance/insulation can be used in addition to glass and resins described above.

Separator 2 has a function to permeate an electrolytic substance in electrolyte 9 therethrough and suppress permeation of hydrogen and oxygen in electrolyte 9. Examples of a material of separator 2 include solid electrolytes such as solid polymer electrolytes, and examples of solid polymer electrolytes include ion-exchange membranes such as Nafion.

For conductive substrate 5, a substrate having a conductive property, or a substrate having a film formed of a material having a conductive property on the surface thereof is used. Examples of conductive substrate 5 include a platinum plate, indium tin oxide (ITO) glass, and a fluorine-doped tin oxide (FTO) glass.

Optical semiconductor electrode 6 is formed of an n-type semiconductor or a p-type semiconductor. When optical semiconductor electrode 6 is formed of an n-type semiconductor, oxygen is produced from optical semiconductor electrode 6 and hydrogen is produced from counter electrode 7. On the contrarily, when optical semiconductor electrode 6 is a p-type semiconductor, hydrogen is produced from optical semiconductor electrode 6 and oxygen is produced from counter electrode 7. In optical semiconductor electrode 6, it is necessary that electrons are excited by light irradiation to decompose water. Thus, optical semiconductor electrode 6 is preferably formed of a semiconductor in which the band edge level of a conduction band is 0 eV (vs. NHE), which is a standard reduction potential of hydrogen ions, or less, and the band edge level of a valence band is 1.23 eV (vs. NHE), which is a standard oxidation potential of water, or more. Preferred examples of such semiconductors include elemental substances of oxides, oxynitrides and nitrides of titanium, zirconium, vanadium, tantalum, niobium, tungsten, iron, copper, zinc, cadmium, gallium, indium and germanium; composite oxides, composite oxynitrides and composite nitrides thereof; and substances formed by adding alkali metal ions or alkaline-earth metal ions to these compounds. Laminated membranes formed by joining together a membrane made of a material in which the band edge level of a conduction band is 0 eV (vs. NHE), which is a standard reduction potential of hydrogen ions, or less, and a membrane made of a material in which the band edge level of a valence band is 1.23 eV (vs. NHE), which is a standard oxidation potential of water, or more are also effectively used. As an example, a $WO_3$/ITO/Si laminated membrane is suitably used.

As counter electrode 7, employed is a material having conductivity, and having activity for a hydrogen producing reaction when optical semiconductor electrode 6 is an n-type semiconductor and having activity for an oxygen producing reaction when optical semiconductor electrode 6 is a p-type semiconductor. Examples of counter electrode 7 material include carbon and noble metals that are commonly used as an electrode for electrolysis of water. Specifically, carbon, platinum, platinum-supported carbon, palladium, iridium, ruthenium and nickel can be employed.

Common metal wires can be used for electrical connection part 8.

Electrolyte 9 put in the first space and the second space have only to be an electrolyte containing water, and may be acidic, neutral or basic. For example, sulfuric acid, hydrochloric acid, potassium chloride, sodium chloride, potassium sulfate, sodium sulfate, sodium hydrogen carbonate, or sodium hydroxide can be suitably used.

A material having corrosion resistance to electrolyte 9 and an insulating property is used for electrolyte supply hole 10 and electrolyte discharge hole 11. The material for first hydrogen circulation hole 12, second hydrogen circulation hole 13, first oxygen circulation hole 14 and second oxygen circulation hole 15 is a material having a function that it does not allow permeation of hydrogen or oxygen therethrough and does not adsorb hydrogen or oxygen in atmospheric pressure or less. Specifically, glass, resins, or metals subjected to surface treatment for corrosion resistance/insulation can be used.

Mutual positional relations among electrolyte supply hole 10, electrolyte discharge hole 11, first hydrogen circulation hole 12, second hydrogen circulation hole 13, first oxygen circulation hole 14 and second oxygen circulation hole 15 are as described above.

Next, the actions of hydrogen producing cell 100 will be described for the case where the oxygen circulation hole is provided.

In hydrogen producing cell 100, light transmitted housing 1 and then electrolyte 9 put in the second space enters optical semiconductor electrode 6. Optical semiconductor electrode 6 absorbs light and photoexcitation of electrons occurs to produce electrons in a conduction band and holes in a valence band in optical semiconductor electrode 6. At this time, since band bending takes place in the vicinity of the surface (interface with electrolyte 9) of optical semiconductor electrode 6 by the contact between optical semiconductor electrode 6 and electrolyte 9, the holes produced by light irradiation move to the surface (interface with electrolyte 9) side of optical semiconductor electrode 6 according to the band bending.

The holes oxidize water molecules at the surface of optical semiconductor electrode 6 to produce oxygen (following reaction formula (1)). On the other hand, electrons produced in the conduction band move to the conductive substrate 5 side. The electrons having moved to conductive substrate 5 side move to the counter electrode 7 side through electrical connection part 8. The electrons having moved within counter electrode 7 and reached the surface (interface with electrolyte 9) of counter electrode 7 reduce protons at the surface of counter electrode 7 to produce hydrogen.

$$4h^+ + 2H_2O \rightarrow O_2\uparrow + 4H^+ \qquad (1)$$

$$4e^- + 4H^+ \rightarrow 2H_2\uparrow \qquad (2)$$

Hydrogen bubbles produced at the surface of counter electrode 7 rise in electrolyte 9 put in the first space and reach above the liquid level of electrolyte 9. Thereafter, the hydrogen moves to the outside of hydrogen producing cell 100 through first hydrogen circulation hole 12 and second hydrogen circulation hole 13. On the other hand, oxygen bubbles produced at the surface of optical semiconductor electrode 6 rise in electrolyte 9 put in the second space and reach above the liquid level of electrolyte 9. Thereafter, the oxygen moves to the outside of hydrogen producing cell 100 through first oxygen circulation hole 14 and second oxygen circulation hole 15.

The amount of electrolyte 9 is reduced as production of hydrogen and oxygen by photodecomposition of water proceeds. In order to replenish the reduced electrolyte 9, a required amount of electrolyte is supplied from electrolyte supply hole 10 to the first space and the second space. At this time, since the excessively supplied electrolyte is spontaneously discharged from electrolyte discharge hole 11 with gravity, heights of liquid levels of electrolyte 9 in the first space and in the second space are constantly maintained at the height of the lower end of electrolyte discharge hole 11. Therefore, it is possible to attain easily a mechanism in which electrolyte 9 does not enter and only gases are circulated in all hydrogen circulation holes and oxygen circulation holes 12 to 15 arranged on a vertically upper side than electrolyte discharge hole 11.

(Second Exemplary Embodiment)

As described above, mutual positional relations among electrolyte supply hole 10, electrolyte discharge hole 11, first hydrogen circulation hole 12 and second hydrogen circulation hole 13 in the hydrogen producing cell of the present invention are positional relations which should be satisfied in a state where the hydrogen producing cell is ultimately disposed as a hydrogen producing device or an energy system.

Accordingly, not only the positional relations among electrolyte supply hole 10, electrolyte discharge hole 11, first hydrogen circulation hole 12 and second hydrogen circulation hole 13 are defined assuming that hydrogen producing cell 100 is disposed on a horizontal plane as with first exemplary embodiment, but also the positional relations may be defined assuming that the hydrogen producing cell is disposed in a state of being inclined at a given angle on, for example, a roof or a rooftop, or assuming that the hydrogen producing cell is disposed in a state of being placed horizontally on an aqueous surface of a pool.

Then, a hydrogen producing device in an exemplary embodiment of the case where hydrogen producing cell 200 is disposed at an angle θ with respect to a horizontal plane will be described with reference to FIG. 2A.

Figure 2A:
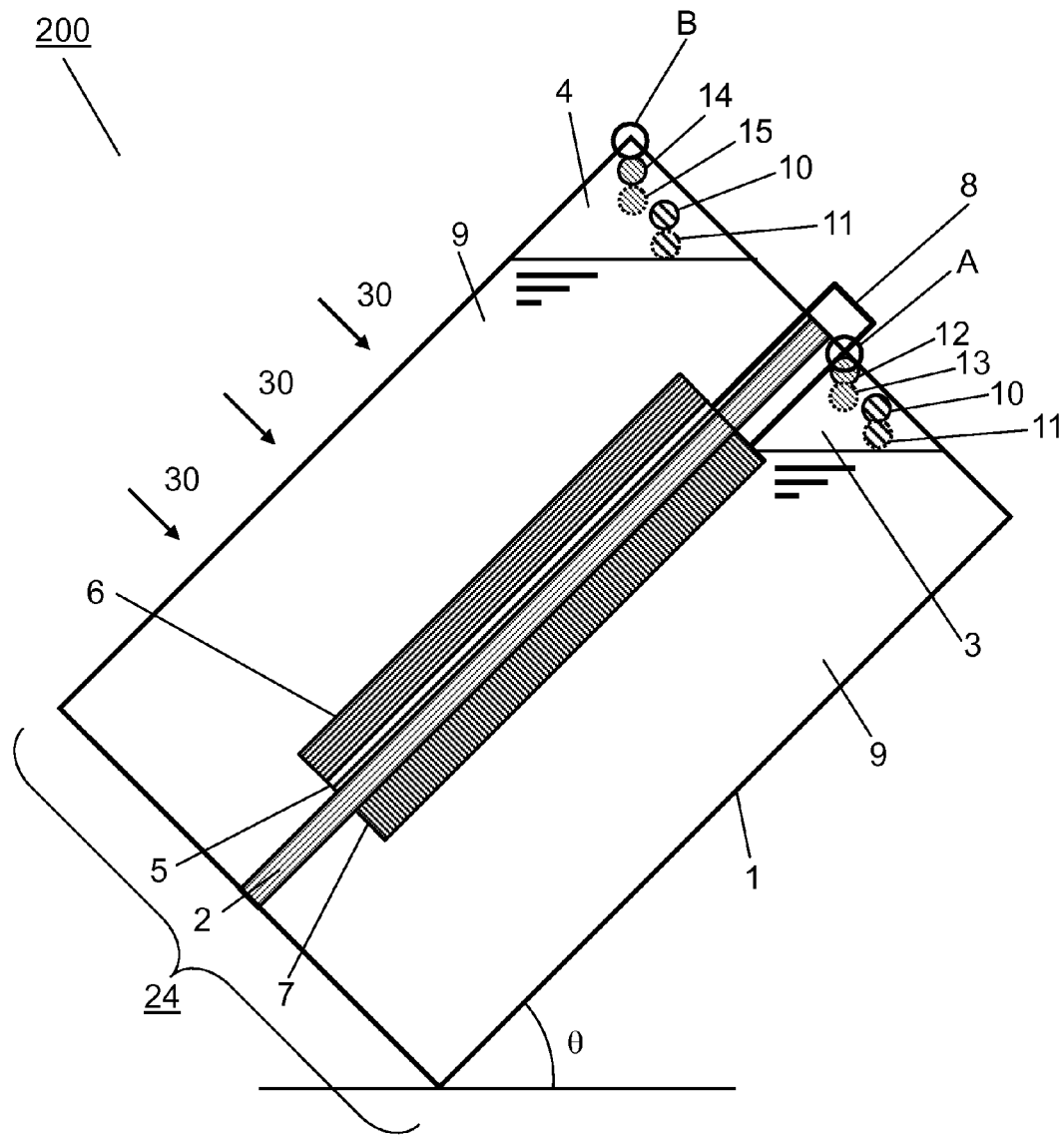
FIG. 2A is a schematic view showing a configuration of a hydrogen producing cell of second exemplary embodiment of the present invention.

FIG. 2A is a schematic view showing a configuration of a hydrogen producing cell of the present exemplary embodiment.

Hydrogen producing cell 200 includes the same constituent components as in hydrogen producing cell 100 in first exemplary embodiment. Compared with hydrogen producing cell 100, although hydrogen producing cell 200 is different in only positions of electrolyte supply hole 10, electrolyte discharge hole 11, first hydrogen circulation hole 12 and second hydrogen circulation hole 13 from hydrogen producing cell 100, mutual positional relations among these holes of hydrogen producing cell 200 are the same as those in hydrogen producing cell 100 in a state where hydrogen producing cell 200 is disposed at an angle θ with respect to a horizontal plane.

That is, in a state of FIG. 2A in which hydrogen producing cell 200 is disposed, electrolyte supply hole 10 is arranged on a vertically upper side than electrolyte discharge hole 11, first hydrogen circulation hole 12 is arranged on a vertically upper side than electrolyte supply hole 10, and second hydrogen circulation hole 13 is arranged on a vertically upper side than electrolyte discharge hole 11.

Moreover, when oxygen is collected, first oxygen circulation hole 14 and second oxygen circulation hole 15 should be disposed on the second space side so as to be in the same positional relation as in first exemplary embodiment in a state where hydrogen producing cell 200 is disposed.

That is, in a state of FIG. 2A in which hydrogen producing cell 200 is disposed, electrolyte supply hole 10 is arranged on a vertically upper side than electrolyte discharge hole 11, first oxygen circulation hole 14 is arranged on a vertically upper side than electrolyte supply hole 10, and second oxygen circulation hole 15 is arranged on a vertically upper side than electrolyte discharge hole 11.

From the above, as with first exemplary embodiment, also in a state where hydrogen producing cell 200 is disposed at an angle θ with respect to a horizontal plane, it is possible to attain easily a mechanism that electrolyte 9 does not enter and only gases are circulated in all hydrogen circulation holes and oxygen circulation holes 12 to 15 arranged on a vertically upper side than electrolyte discharge hole 11.

Moreover, in accordance with the configuration of the hydrogen producing cell of the present exemplary embodiment, production efficiency of hydrogen in hydrogen producing cell 200 can be improved since larger dose of irradiation light 30 can be taken in by employing a value determined in consideration of the latitude of Japan as the angle θ. Further, since this configuration can be efficiently disposed on a slanting roof or the like, it can contribute to space saving.

Herein, production efficiency of hydrogen can be further improved by arranging first hydrogen circulation hole 12 in hydrogen producing cell 200 at a vertically uppermost position in first space 3.

FIG. 2B is a schematic view showing another configuration of hydrogen producing cell 200 of the present exemplary embodiment.

In the present configuration, first hydrogen circulation hole 12 is arranged immediately below a corner portion A of housing 1 which is a vertically uppermost position in first space 3. It is desirable that second hydrogen circulation hole 13 is also arranged close to first hydrogen circulation hole 12 as far as possible. By doing so, since the liquid level of electrolyte 9 can be raised to a position as high as possible in a vertical direction in first space 3, it becomes possible to increase the area of a portion of counter electrode 7 immersed in electrolyte 9 as far as possible.

It is desirable that first oxygen circulation hole 14 is also arranged immediately below a corner portion B of housing 1 which is a vertically uppermost position in second space 4. It is desirable that second oxygen circulation hole 15 is also arranged close to the first oxygen circulation hole as far as possible. By doing so, since the liquid level of electrolyte 9 can be raised to a position as high as possible in a vertical direction in second space 4, it becomes possible to increase the area of a portion of optical semiconductor electrode 6 immersed in electrolyte 9 as far as possible.

From the above descriptions, a dead space in first space 3 and second space 4 of hydrogen producing cell 200 can be minimized and the area of a portion of optical semiconductor electrode 6 or counter electrode 7 immersed in electrolyte 9 can be maximized, and therefore production efficiency of hydrogen in hydrogen producing cell 200 can be further improved.

(Third Exemplary Embodiment)

Figure 3A:
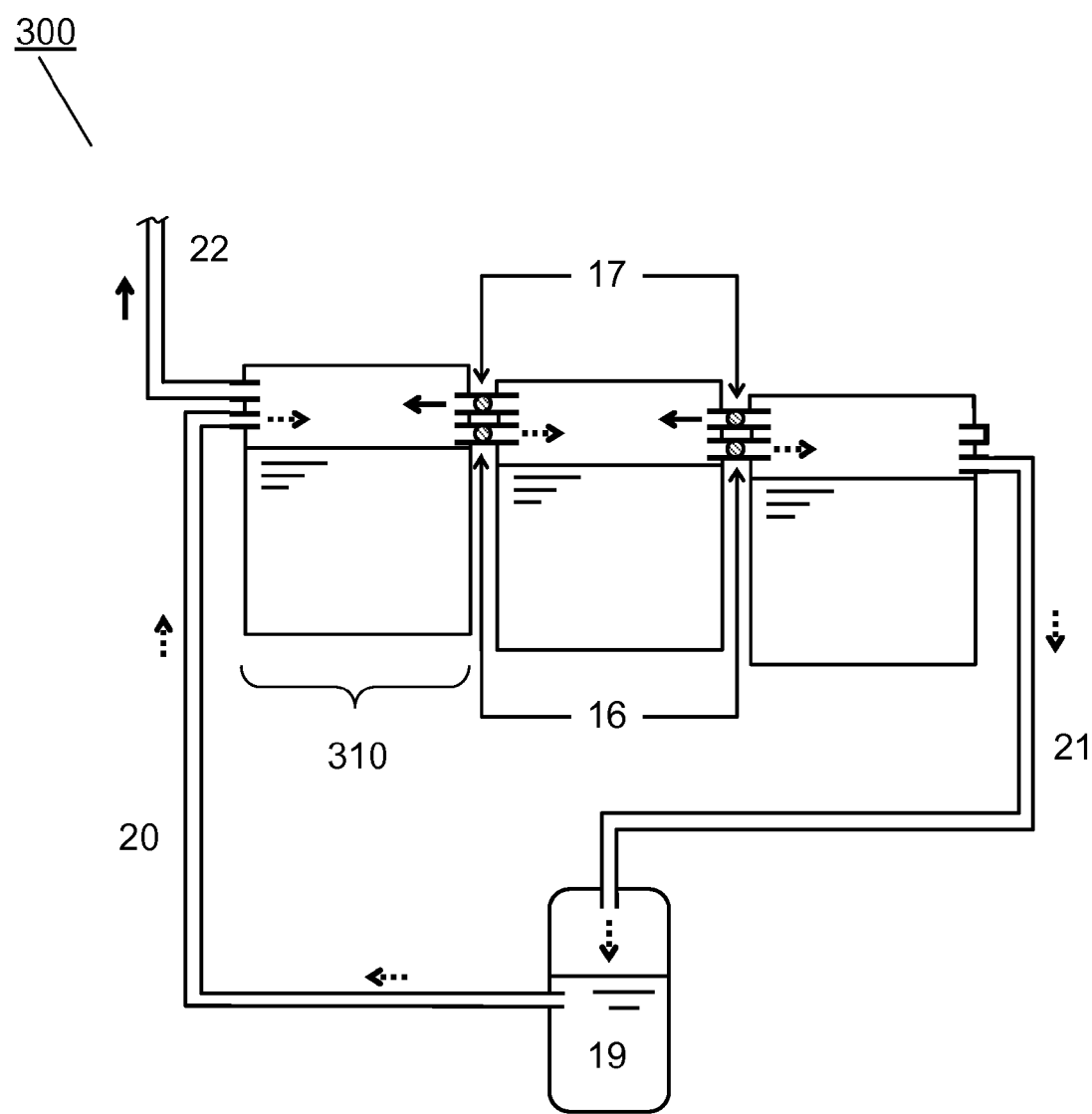
FIG. 3A is a schematic view showing a configuration of a hydrogen producing device of third exemplary embodiment of the present invention.

A hydrogen producing cell of third exemplary embodiment 1 of the present invention will be described with reference to FIG. 3A. FIG. 3A is a schematic view showing a configuration of a hydrogen producing device of the present exemplary embodiment.

Hydrogen producing device 300 of the present exemplary embodiment has the same constitution as in hydrogen producing cell 100 in first exemplary embodiment except that first joint 16 and second joint 17 are added, that a plurality of hydrogen producing cells are connected to one another through first joint 16 and second joint 17, that electrolyte storage unit 19, electrolyte supply pipe 20 and electrolyte discharge pipe 21 are added as an electrolyte circulating mechanism, and that hydrogen collecting pipe 22 is added as a hydrogen collecting mechanism. Therefore, herein, only the first and second joints, a connecting mechanism between a plurality of hydrogen producing cells, an electrolyte circulating mechanism and a hydrogen collecting mechanism will be described.

Hydrogen producing cell 310 constituting hydrogen producing device 300 is provided with first joint 16 and second joint 17 as shown below.

Electrolyte supply hole 10 and electrolyte discharge hole 11 are provided with first joints 16 which simply connect electrolyte supply hole 10 to electrolyte discharge hole 11. First joints 16 have only to be those which are composed of a material having corrosion resistance to the electrolyte and an insulating property, and are a mechanism that does not cause oxygen leakage. For example, rubbers, resins, or metals subjected to surface treatment for corrosion resistance/insulation can be used.

First hydrogen circulation hole 12 and second hydrogen circulation hole 13 are provided with second joints 17 which simply connect first hydrogen circulation hole 12 to second hydrogen circulation hole 13. Second joints 17 have only to be those which are composed of a material having a function that it does not allow permeation of hydrogen therethrough and does not adsorb hydrogen in atmospheric pressure or less, and is a mechanism that does not cause hydrogen leakage. For example, rubbers, resins, or metals subjected to surface treatment for corrosion resistance/insulation can be used.

Further, first oxygen circulation hole 14 and second oxygen circulation hole 15 may be provided with third joints 18 (not shown) which simply connect first oxygen circulation hole 14 to second oxygen circulation hole 15 as required. Third joints 18 have only to be those which are composed of a material having a function that it does not allow permeation of oxygen therethrough and does not adsorb oxygen in atmospheric pressure or less, and is a mechanism that does not cause oxygen leakage. For example, rubbers, resins, or metals subjected to surface treatment for corrosion resistance/insulation can be used.

The following holes are arranged so that a distance between the position of electrolyte supply hole 10 in contact with the first space side and the position of first hydrogen circulation hole 12 is equal to a distance between the position of electrolyte discharge hole 11 of a hydrogen producing cell in contact with the first space side on an upstream side and the position of second hydrogen circulation hole 13. Further, when oxygen circulation holes are disposed as required to be mutually connected to one another, the following holes are arranged so that a distance between the position of electrolyte supply hole 10 in contact with the second space side and the position of first oxygen circulation hole 14 is equal to a distance between the position of electrolyte discharge hole 11 of a hydrogen producing cell in contact with the second space side on an upstream side and the position of second oxygen circulation hole 15. Thereby, the completely same two hydrogen producing cells 310 can be connected to each other in at least three points of first joint 16 and second joint 17 on the first space side and the second space side. Hydrogen producing cells 310 can be sequentially linked with one another only by preparing a plurality of hydrogen producing cells 310 and repeatedly connecting the cells.

In addition, in hydrogen producing device 300, electrolyte storage unit 19, electrolyte supply pipe 20, electrolyte discharge pipe 21 and hydrogen collecting pipe 22 are disposed.

Electrolyte storage unit 19, electrolyte supply pipe 20 and electrolyte discharge pipe 21 are formed of a material having corrosion resistance to the electrolyte. For example, glass, resins, or metals subjected to surface treatment for corrosion resistance/insulation can be used.

In electrolyte storage unit 19, a mechanism for supplying water and an electrolyte into the electrolyte storage unit is provided so that the electrolyte concentration can be appropriately adjusted. In addition, a mechanism for sending out a required amount of electrolyte to electrolyte supply pipe 20 is provided.

Electrolyte supply pipe 20 is arranged so as to connect electrolyte storage unit 19 with electrolyte supply hole 10 of hydrogen producing cell 310 arranged on the vertically uppermost side (the most upstream in terms of the electrolyte) in hydrogen producing device 300.

Electrolyte discharge pipe 21 is arranged so as to connect electrolyte storage unit 19 with electrolyte discharge hole 11 of hydrogen producing cell 310 arranged on the vertically lowermost side (the most downstream in terms of the electrolyte) in hydrogen producing device 300.

Hydrogen collecting pipe 22 is composed of a material having a function that it does not allow permeation of hydrogen therethrough and does not adsorb hydrogen in atmospheric pressure or less. For example, glass, resins, or metals can be used.

Hydrogen collecting pipe 22 is arranged, for example, so as to connect, at one end thereof, to first hydrogen circulation hole 12 of hydrogen producing cell 310 arranged on the vertically uppermost side (the most upstream in terms of the electrolyte) in hydrogen producing device 300. At this time, an extra hydrogen circulation hole which is not connected to any other hole is preferably sealed.

Further, when oxygen is collected, it is also possible to dispose oxygen collecting pipe 23 which is composed of a material having a function that it does not allow permeation of oxygen therethrough and does not adsorb oxygen in atmospheric pressure or less, and is arranged in the same way as hydrogen collecting pipe 22. At this time, an extra oxygen circulation hole which is not connected to any other hole is preferably sealed.

In a conventional photo-assisted water electrolysis apparatus, it is necessary to attach a hydrogen collecting pipe to each of photo-assisted water electrolysis cells to be arranged, and therefore the photo-assisted water electrolysis apparatus has problems that the configuration is complicated and the length of the hydrogen collecting pipe is significantly long, that there are many manifolds and control of circulation of hydrogen is difficult, and that man-hours required for disposing pipes increase. However, by employing the configuration of hydrogen producing device 300 of the present invention, the length of a pipe for collecting hydrogen and the number of manifolds can be considerably reduced to solve all of the problems described above. Further, it is possible to perform the linkage of a large number of hydrogen producing cells simply and rationally.

Next, the actions of hydrogen producing device 300 will be described. The actions of hydrogen producing device 300 is the same as in hydrogen producing cell 100 described in first exemplary embodiment except that first to third joints 16 to 18 are added, that a plurality of hydrogen producing cells are connected to one another through first to third joints 16 to 18, that electrolyte storage unit 19, electrolyte supply pipe 20 and electrolyte discharge pipe 21 are added as an electrolyte circulating mechanism, and that hydrogen collecting pipe 22 is added as a hydrogen collecting mechanism. Therefore, herein, only the first to third joints, a connecting mechanism between a plurality of hydrogen producing cells, an electrolyte circulating mechanism and a hydrogen collecting mechanism will be described.

When electrolyte storage unit 19 is actuated, a required amount of electrolyte stored in electrolyte storage unit 19 passes through electrolyte supply pipe 20 and is supplied to hydrogen producing cell 310 arranged on the vertically uppermost side (the most upstream in terms of the electrolyte) in hydrogen producing device 300. Furthermore, electrolyte 9 is sequentially supplied to the respective hydrogen producing cells through a connection point of first joint 16 from upstream to downstream. As a result of this, the electrolyte level is stabilized at a predetermined height in each hydrogen producing cell. Finally, the electrolyte discharged from electrolyte discharge hole 11 of the hydrogen producing cell arranged on the vertically lowermost side (the most down stream in terms of the electrolyte) passes through electrolyte discharge pipe 21 and returns to electrolyte storage unit 19.

Hydrogen accumulated in the upper portion of the first space of each hydrogen producing cell 310 repeats the movement to a neighboring cell through a hydrogen circulation hole, and is ultimately collected from hydrogen collecting pipe 22.

In hydrogen producing device 300, since the amount of the electrolyte is reduced by the amount of water decomposed by light irradiation, water and an electrolyte are appropriately replenished to electrolyte storage unit 19. Thereby, the concentration of electrolyte 9 in hydrogen producing device 300 is kept constant.

As a result, hydrogen produced in many hydrogen producing cells can be collected with a considerably reduced length of a pipe for collecting hydrogen and a considerably reduced number of manifolds. This facilitates the execution of work on the roofs of buildings or hydrogen stations, and improves practicality.

Further, by disposing oxygen collecting pipe 23 which operates as with hydrogen collecting pipe 23 as required, it becomes possible to efficiently collect oxygen accumulated in the upper portion of the second space of each hydrogen producing cell 310.

Figure 3B:
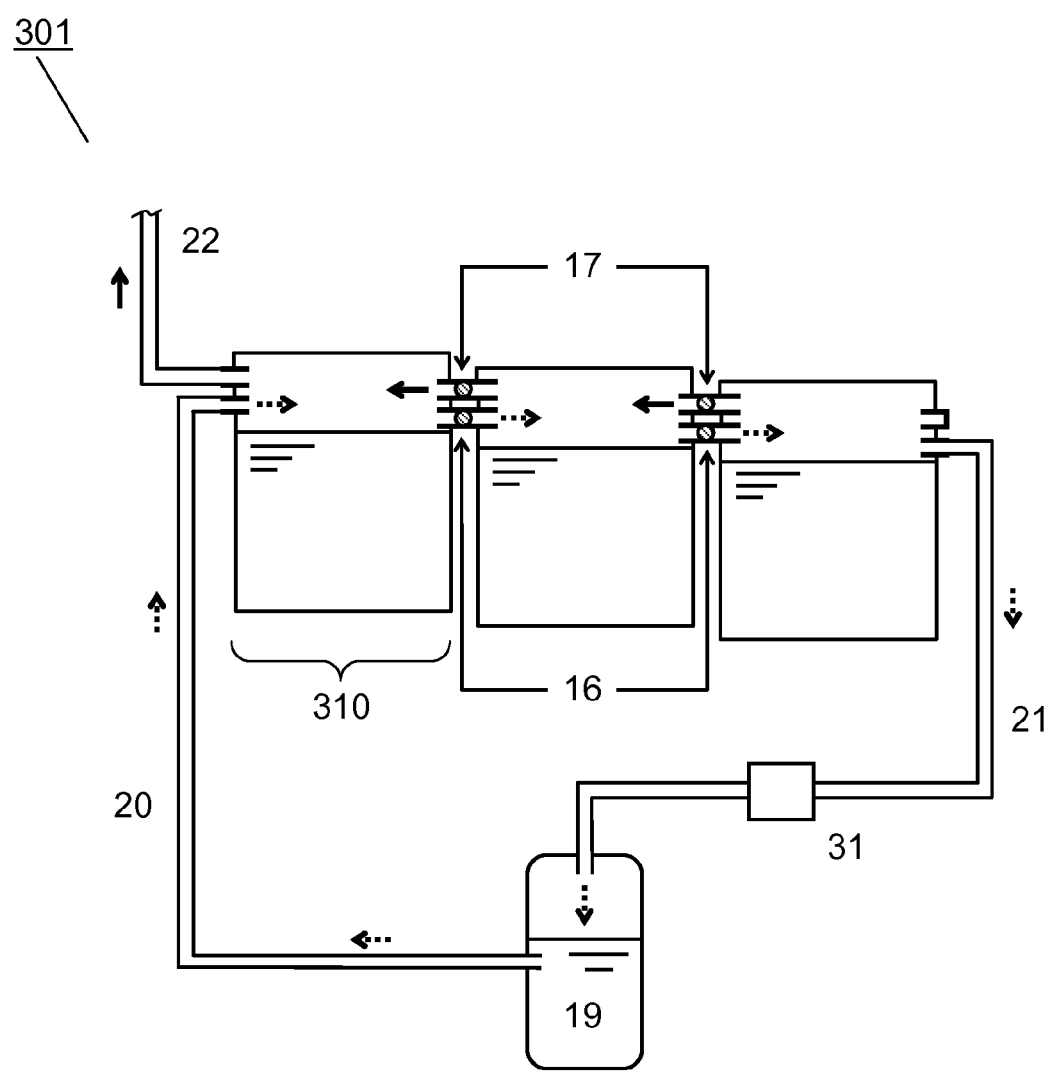
FIG. 3B is a schematic view showing a configuration of a variation of the hydrogen producing device of third exemplary embodiment of the present invention.

In the hydrogen producing device of the present exemplary embodiment, it is possible to automatically replenish the reduced amount of the electrolyte by further disposing electrolyte detection sensor 31. FIG. 3B is a schematic view showing a configuration of a variation of the hydrogen producing device of the present exemplary embodiment.

In hydrogen producing device 301, electrolyte detection sensor 31, which can detect the presence or absence of passage of the electrolyte, is placed at midpoint of electrolyte discharge pipe 21 in hydrogen producing device 300. Electrolyte detection sensor 31 may be placed in electrolyte storage unit 19.

Electrolyte 9 is reduced gradually by the action of hydrogen producing device 301. Thus, electrolyte 9 is supplied to each hydrogen producing cell 310 through electrolyte supply pipe 20 from electrolyte storage unit 19, for example, at a predetermined time. Electrolyte 9 flows from electrolyte supply hole 10 of each hydrogen producing cell 310 through electrolyte discharge hole 11, and ultimately flows into electrolyte discharge pipe 21 and is detected by electrolyte detection sensor 31. At this time, by stopping the supply of electrolyte 9 from electrolyte storage unit 19, a required amount of electrolyte 9 can be automatically replenished to each hydrogen producing cell 310 only when needed.

(Fourth Exemplary Embodiment)

Figure 4:
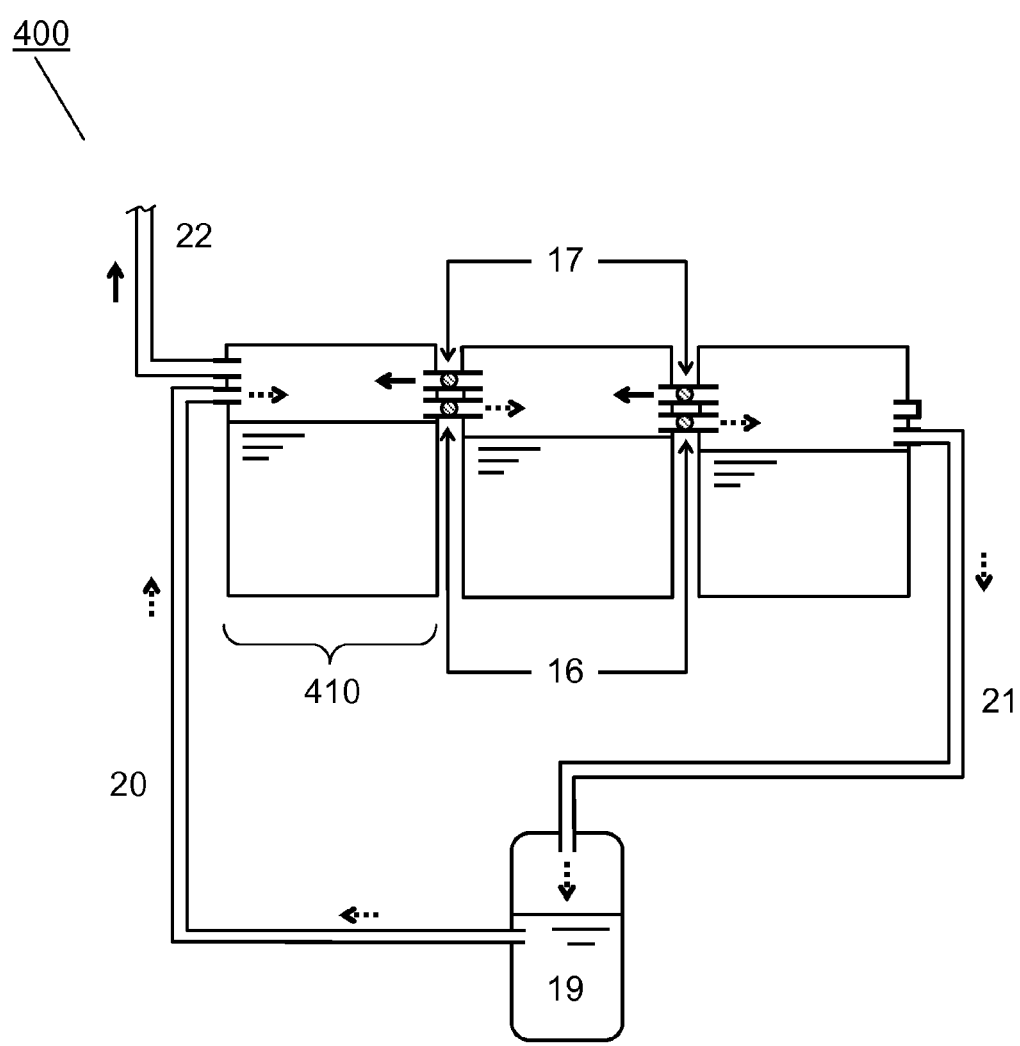
FIG. 4 is a schematic view showing a configuration of a hydrogen producing device of fourth exemplary embodiment of the present invention.

A hydrogen producing device of fourth exemplary embodiment of the present invention will be described with reference to FIG. 4. FIG. 4 is a schematic view showing a configuration of a hydrogen producing device of the present exemplary embodiment.

Hydrogen producing device 400 of the present exemplary embodiment has the same configuration as in hydrogen producing device 300 of third exemplary embodiment except for positional relations among hydrogen producing cells 410 constituting hydrogen producing device 400, and arrangement manner of electrolyte supply hole 10, electrolyte discharge hole 11, first hydrogen circulation hole 12 and second hydrogen circulation hole 13 in each hydrogen producing cell 410. Therefore, herein, only the positional relation between the hydrogen producing cells, and arrangement manner of the electrolyte supply pipe/electrolyte discharge pipe and the hydrogen circulation hole will be described.

In hydrogen producing device 400, all hydrogen producing cells 410 are arranged in such a way that there is no difference in level between top surfaces thereof and between bottom surfaces thereof.

Electrolyte supply hole 10, electrolyte discharge hole 11, first hydrogen circulation hole 12 and second hydrogen circulation hole 13 in each hydrogen producing cell 410 are arranged so as to meet the above-mentioned rule concerning the positional relations. That is, electrolyte supply hole 10 is arranged on a vertically upper side than electrolyte discharge hole 11. First hydrogen circulation hole 12 is arranged on a vertically upper side than electrolyte supply hole 10. Second hydrogen circulation hole 13 is arranged on a vertically upper side than electrolyte discharge hole 11. Further, electrolyte supply hole 10 and electrolyte discharge hole 11 as well as first hydrogen circulation hole 12 and second hydrogen circulation hole 13, which are each a pair to be connected to each other in neighboring cells, are respectively arranged at the same height (distance from a cell bottom surface). Thereby, the rule that "all hydrogen producing cells are arranged in such a way that there is no difference in level between top surfaces thereof and between bottom surfaces thereof" described above is ensured. However, as a result of this, arranged heights (distance from the cell bottom surface) of the electrolyte supply pipe/electrolyte discharge pipe and the hydrogen circulation hole inevitably vary from cell to cell.

In addition, the oxygen circulation hole for collecting oxygen may be arranged as required in the same manner as in the hydrogen circulation hole.

According to the configuration of the present exemplary embodiment, all hydrogen producing cells are aligned laterally in a straight line at the time of setting up the hydrogen producing device. Therefore, in setting up the hydrogen producing device, it is possible to reduce the area of a part where no hydrogen producing cell is arranged in the surfaces of roofs of buildings or hydrogen stations which are generally rectangular or trapezoid, and therefore practicality is improved.

The action of hydrogen producing device 400 is the same as in hydrogen producing device 300 in third exemplary embodiment, and thus the description thereof is omitted.

In addition, it is also possible to automatically replenish the reduced amount of the electrolyte by applying electrolyte detection sensor 31 in hydrogen producing device 301 of third exemplary embodiment to hydrogen producing device 400 of the present exemplary embodiment and performing similar control.

(Fifth Exemplary Embodiment)

Figure 5:
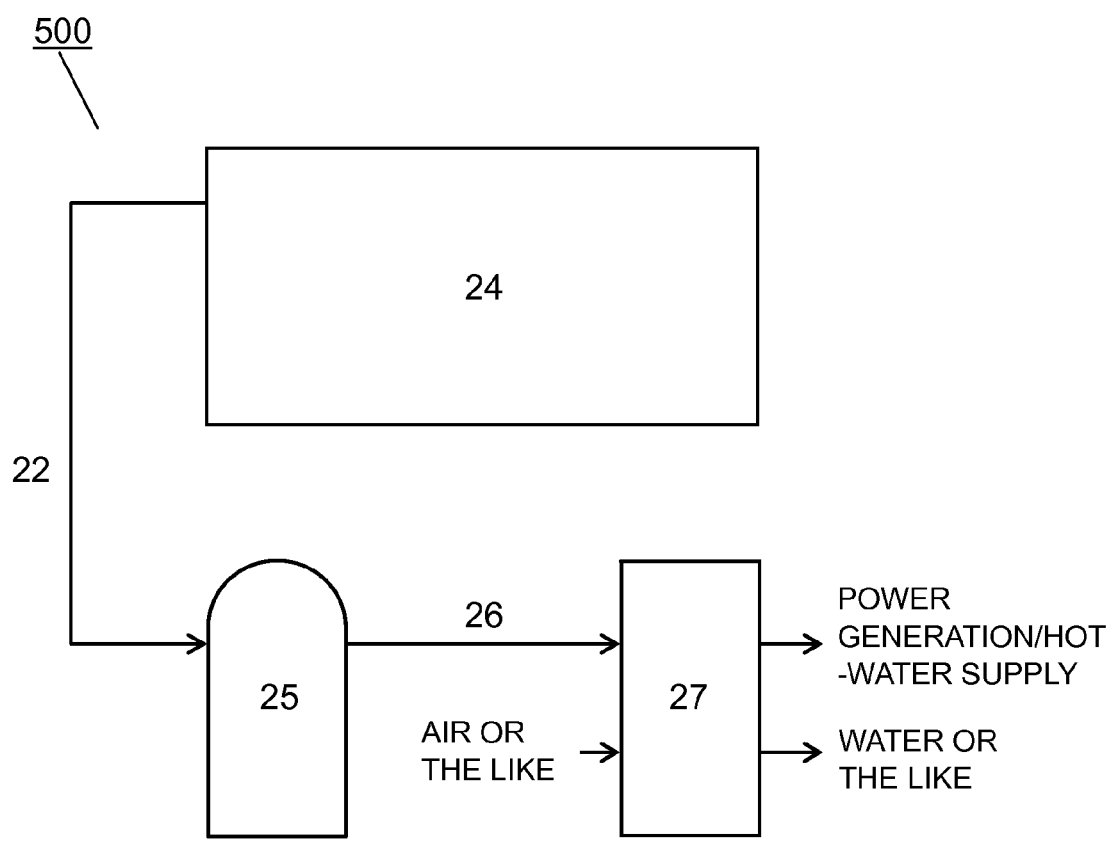
FIG. 5 is a schematic view showing a configuration of an energy system of fifth exemplary embodiment of the present invention.

An energy system of fifth exemplary embodiment of the present invention will be described with reference to FIG. 5. FIG. 5 is a schematic view showing a configuration of an energy system of the present exemplary embodiment.

In energy system 500 of the present exemplary embodiment, in addition to hydrogen producing device 24 having the same configuration as that of hydrogen producing device 300 of third exemplary embodiment, hydrogen storage unit 25, hydrogen supply pipe 26 and fuel cell 27 are disposed.

Of energy system 500 of the present exemplary embodiment, the material and configuration of hydrogen producing device 24 are the same as in hydrogen producing device 300 described in third exemplary embodiment, and thus the descriptions thereof are omitted, and only portions concerning hydrogen storage unit 25, hydrogen supply pipe 26 and fuel cell 27 will be described.

Hydrogen storage unit 25 is disposed so as to be connected to hydrogen collecting pipe 22 at one end and to be connected to hydrogen supply pipe 26 at the other end. The other end of hydrogen supply pipe 26 is disposed so as to be connected to fuel cell 27.

Hydrogen storage unit 25 and hydrogen supply pipe 26 are composed of a material having a function that it does not allow permeation of hydrogen therethrough and does not adsorb hydrogen in atmospheric pressure or less. For example, glass, resins, or metals can be used.

Hydrogen storage unit 25 has a function of taking in a required amount from hydrogen circulated in hydrogen collecting pipe 22 and storing the hydrogen and a function of flowing out a required amount from the stored hydrogen to hydrogen supply pipe 26.

As fuel cell 27, a common fuel cell using hydrogen as a negative electrode active material can be employed. For example, solid polymer fuel cells, phosphate fuel cells, molten carbonate fuel cells, solid oxide fuel cells, alkaline electrolyte fuel cells and the like can be used.

Next, the action of energy system 500 will be described. Of the action of energy system 500, the action of hydrogen producing device 24 is the same as that of hydrogen producing device 300 described in third exemplary embodiment, and thus the description thereof is omitted, and only the actions concerning hydrogen storage unit 25, hydrogen supply pipe 26 and fuel cell 27 will be described.

Hydrogen circulated in hydrogen collecting pipe 22 of the hydrogen producing device flows in hydrogen storage unit 25 by actuation of hydrogen storage unit 25, and is stored therein once. Furthermore, the stored hydrogen is sent out from hydrogen storage unit 25, passes through hydrogen supply pipe 26 and is supplied to fuel cell 27 in accordance with the operating state of fuel cell 27. Gases containing a positive electrode active material, for example, air, beside hydrogen are sent to fuel cell 27, and power generation and hot-water supply are performed in fuel cell 27.

Consumed hydrogen is discharged from fuel cell 27 as water or the like. As a result, there is provided an energy system which can convert light energy of irradiation light 30 to hydrogen energy in hydrogen producing device 24 and further can convert as required the energy to electrical energy in fuel cell 27.

(Sixth Exemplary Embodiment)

Figure 6:
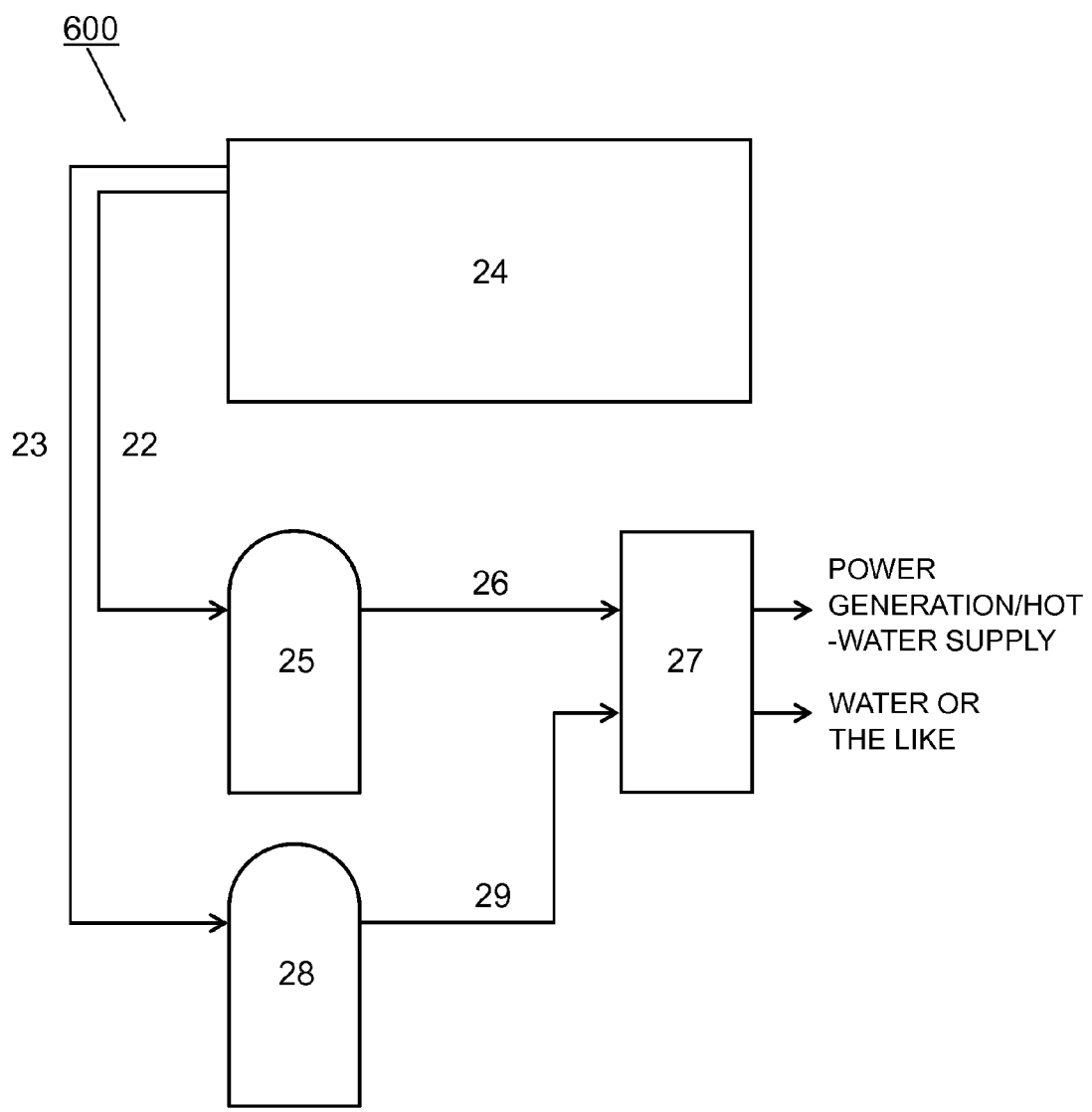
FIG. 6 is a schematic view showing a configuration of an energy system of sixth exemplary embodiment of the present invention.

An energy system of sixth exemplary embodiment of the present invention will be described with reference to FIG. 6. FIG. 6 is a schematic view showing a configuration of an energy system of the present exemplary embodiment.

Energy system 600 of the present exemplary embodiment has the same configuration as that of hydrogen producing device 300 of third exemplary embodiment, and hydrogen storage unit 25, hydrogen supply pipe 26, fuel cell 27, oxygen storage unit 28 and oxygen supply pipe 29 are disposed in addition to hydrogen producing device 24 provided with oxygen collecting pipe 23.

Of energy system 600 of the present exemplary embodiment, materials and configurations of hydrogen producing device 24, hydrogen storage unit 25, hydrogen supply pipe 26 and fuel cell 27 are the same as in energy system 500 described in fifth exemplary embodiment, and thus the descriptions thereof are omitted. Herein, only portions concerning oxygen storage unit 28 and oxygen supply pipe 29 will be described.

Oxygen storage unit 28 is disposed so as to be connected to oxygen collecting pipe 23 at one end and to be connected to oxygen supply pipe 29 at the other end. The other end of oxygen supply pipe 29 is disposed so as to be connected to fuel cell 27.

Oxygen storage unit 28 and oxygen supply pipe 29 are composed of a material having a function that it does not allow permeation of hydrogen therethrough and does not adsorb hydrogen in atmospheric pressure or less. For example, glass, resins, or metals can be used.

Next, the action of energy system 600 will be described. Of the action of energy system 600, the actions of hydrogen producing device 24, hydrogen storage unit 25, hydrogen supply pipe 26 and fuel cell 27 are the same as those of energy system 500 described in fifth exemplary embodiment, and thus the descriptions thereof are omitted. Herein, only actions concerning oxygen storage unit 28 and oxygen supply pipe 29 will be described.

Oxygen circulated in oxygen collecting pipe 23 of the hydrogen producing device flows in oxygen storage unit 28 by actuation of oxygen storage unit 28, and is stored therein once. Furthermore, the stored oxygen is sent out from oxygen storage unit 28, passes through oxygen supply pipe 29 and is supplied to fuel cell 27 in accordance with the operating state of fuel cell 27. Hydrogen is sent as a negative electrode active material, and oxygen is sent as a positive electrode active material to fuel cell 27, and power generation and hot-water supply are performed in fuel cell 27. Consumed hydrogen and oxygen react with each other to form water and discharged from fuel cell 27. Since energy system 600 of the present exemplary embodiment operates the fuel cell by using pure oxygen, it is an energy system in which energy conversion efficiency of a fuel cell is significantly high compared with energy system 500 of fifth exemplary embodiment that utilizes air or the like.

The invention claimed is:

1. A hydrogen producing cell which decomposes water by irradiating an optical semiconductor electrode with light to produce hydrogen, the cell comprising:
   a housing whose surface irradiated with light has a light-transmitting property;
   a separator separating a space within the housing into a first space and a second space;
   a counter electrode arranged in the first space;

an optical semiconductor electrode arranged in the second space and formed on a conductive substrate;
an electrical connection part electrically connecting the optical semiconductor electrode with the counter electrode; and
an electrolyte containing water in the first space and in the second space, and
the cell being provided with:
an electrolyte supply hole and an electrolyte discharge hole respectively penetrating the housing, and
a first hydrogen circulation hole and a second hydrogen circulation hole respectively penetrating the housing in contact with, of the first space and the second space, a space in which hydrogen is produced,
wherein the electrolyte supply hole is arranged on a vertically upper side than the electrolyte discharge hole,
the first hydrogen circulation hole is arranged on a vertically upper side than the electrolyte supply hole, and
the second hydrogen circulation hole is arranged on a vertically upper side than the electrolyte discharge hole.

2. The hydrogen producing cell according to claim 1, being further provided with:
a first oxygen circulation hole and a second oxygen circulation hole respectively penetrating the housing in contact with, of the first space and the second space, a space in which oxygen is produced,
wherein the electrolyte supply hole is arranged on a vertically upper side than the electrolyte discharge hole,
the first oxygen circulation hole is arranged on a vertically upper side than the electrolyte supply hole, and
the second oxygen circulation hole is arranged on a vertically upper side than the electrolyte discharge hole.

3. The hydrogen producing cell according to claim 1, wherein the hydrogen producing cell is disposed at a given angle θ with respect to a horizontal plane, and satisfies all of the arrangements in this state.

4. The hydrogen producing cell according to claim 3, wherein the first hydrogen circulation hole is arranged at a vertically uppermost position in a space in which hydrogen is produced of the first space and the second space.

5. The hydrogen producing cell according to claim 2, wherein the hydrogen producing cell is disposed at a given angle θ with respect to a horizontal plane, and satisfies all of the arrangements in this state,
and the first oxygen circulation hole is arranged at a vertically uppermost position in a space in which oxygen is produced of the first space and the second space.

6. The hydrogen producing cell according to claim 1, wherein the separator is an ion-exchange membrane.

7. The hydrogen producing cell according to claim 1, wherein the separator has an opening for circulating the electrolyte.

8. The hydrogen producing cell according to claim 1, wherein the electrolyte supply hole and the electrolyte discharge hole are provided with a first joint, and
the first hydrogen circulation hole and the second hydrogen circulation hole are provided with a second joint.

9. The hydrogen producing cell according to claim 8, wherein the first oxygen circulation hole and the second oxygen circulation hole are provided with a third joint.

10. A hydrogen producing device comprising the hydrogen producing cell according to claim 8,
wherein in the plurality of neighboring hydrogen producing cells,
the electrolyte supply hole and the electrolyte discharge hole are connected to each other by the first joint, and the first hydrogen circulation hole and the second hydrogen circulation hole are connected to each other by the second joint.

11. A hydrogen producing device comprising the hydrogen producing cell according to claim 9,
wherein in the plurality of neighboring hydrogen producing cells,
the first oxygen circulation hole and the second oxygen circulation hole are connected to each other by the third joint.

12. The hydrogen producing device according to claim 10,
wherein the plurality of hydrogen producing cells are arranged in such a way that there is no difference in level between top surfaces thereof and between bottom surfaces thereof, and
a position of the electrolyte supply hole in the housing of one hydrogen producing cell from a top surface of the hydrogen producing cell is vertically lower than a position of the electrolyte supply hole in the housing of a hydrogen producing cell immediately before the above hydrogen producing cell in terms of supply of the electrolyte from a top surface of the hydrogen producing cell.

13. The hydrogen producing device according to claim 10, further comprising:
an electrolyte storage unit;
an electrolyte supply pipe connecting the electrolyte storage unit to an electrolyte supply hole arranged on the vertically uppermost side in the hydrogen producing device; and
an electrolyte discharge pipe connecting the electrolyte discharge hole arranged on the vertically lowermost side in the hydrogen producing cell or the hydrogen producing device to the electrolyte storage unit.

14. The hydrogen producing device according to claim 13, further comprising:
an electrolyte detection sensor in the electrolyte discharge pipe or the electrolyte storage unit,
wherein supply of an electrolyte from the electrolyte storage unit to the electrolyte supply pipe is stopped when the electrolyte detection sensor detects an electrolyte.

15. The hydrogen producing device according to claim 13,
wherein the hydrogen producing device has, in the electrolyte storage unit, a mechanism for supplying water and an electrolyte into the electrolyte storage unit.

16. The hydrogen producing device according to claim 10,
wherein the hydrogen producing device has a hydrogen collecting pipe connected, at one end thereof, to a first or second hydrogen circulation hole which is not connected to a first or second hydrogen circulation hole of another hydrogen producing cell.

17. The hydrogen producing device according to claim 10,
wherein the hydrogen producing device has an oxygen collecting pipe connected, at one end thereof, to a first or a second oxygen circulation hole which is not connected to a first or second oxygen circulation hole of another hydrogen producing cell.

18. An energy system comprising the hydrogen producing device according to claim 10,
the system comprising:
the hydrogen producing device,
a hydrogen storage unit for storing hydrogen produced in the hydrogen producing device, and
a fuel cell.

19. The energy system according to claim 18, further comprising:
an oxygen storage unit for storing oxygen produced in the hydrogen producing device.

* * * * *